United States Patent
Rakes et al.

(10) Patent No.: US 9,555,485 B2
(45) Date of Patent: Jan. 31, 2017

(54) DIAMOND PLATED GRINDING ENDMILL FOR ADVANCED HARDENED CERAMICS MACHINING

(71) Applicant: G.W. Schultz Tool, Inc., Tavares, FL (US)

(72) Inventors: Jeremi Rakes, Leesburg, FL (US); Ken Merrit, White, GA (US)

(73) Assignee: GWS Tool, LLC, West Palm BEach, FL (US)

( * ) Notice: Subject to any disclaimer, the term of this patent is extended or adjusted under 35 U.S.C. 154(b) by 449 days.

(21) Appl. No.: 14/261,643

(22) Filed: Apr. 25, 2014

(65) Prior Publication Data

US 2015/0306685 A1  Oct. 29, 2015

(51) Int. Cl.
| | | |
|---|---|---|
| *B23C 5/10* | (2006.01) | |
| *B23C 5/16* | (2006.01) | |
| *B23C 5/28* | (2006.01) | |
| *B24D 5/02* | (2006.01) | |
| *B24D 5/10* | (2006.01) | |
| B23C 5/00 | (2006.01) | |

(52) U.S. Cl.
CPC . *B23C 5/10* (2013.01); *B23C 5/16* (2013.01); *B23C 5/28* (2013.01); *B24D 5/02* (2013.01); *B24D 5/10* (2013.01); *B23C 2210/40* (2013.01); *B23C 2226/18* (2013.01); *B23C 2226/31* (2013.01); *B23C 2228/10* (2013.01); *B23C 2250/12* (2013.01)

(58) Field of Classification Search
CPC ................ B23C 5/10; B23C 5/16; B23C 5/28; B23C 2210/40; B23C 2226/31; B23C 2226/18; B23C 2250/12; B23C 2228/10
See application file for complete search history.

(56) References Cited

U.S. PATENT DOCUMENTS

| | | |
|---|---|---|
| 2,080,401 A | 5/1937 | Heard |
| 2,786,373 A | 12/1953 | Patton |
| 2,806,331 A | 9/1957 | Hoye |
| 3,121,979 A | 2/1964 | Gray et al. |
| 3,597,817 A | 8/1971 | Whalley |
| 3,818,644 A | 6/1974 | Walters |
| 3,882,580 A | 5/1975 | Lundgren |
| 3,921,616 A | 11/1975 | Kish |
| 4,322,189 A | 3/1982 | Briese |
| 4,359,299 A | 11/1982 | Sagarian |
| 4,721,421 A | 1/1988 | Klinger |

(Continued)

*Primary Examiner* — Will Fridie, Jr.
(74) *Attorney, Agent, or Firm* — Eric M. Cipparone; Beusse, Wolter, Sanks & Maire, PLLC

(57) ABSTRACT

A grinding tool for reducing damage to the tool during a milling operation is provided in an embodiment herein, including a generally cylindrical body having a first and second end, a grinding portion adjacent to the first end and a shank portion adjacent to the second end. An outer surface of the tool includes a diamond coating, two or more flutes formed in the grinding portion, and at least one grinding element formed in the grinding portion between the two or more flutes, wherein the flutes and grinding element are disposed along a longitudinal axis of the tool. The at least one grinding element includes a grinding surface, a leading edge and a trailing edge. A first radius at the leading edge of the grinding element is smaller than a second radius at the trailing edge of the grinding element.

20 Claims, 5 Drawing Sheets

(56) References Cited

U.S. PATENT DOCUMENTS

| | | | |
|---|---|---|---|
| 5,032,049 A | 7/1991 | Hessman et al. | |
| 5,049,009 A | 9/1991 | Beck et al. | |
| 5,115,697 A * | 5/1992 | Rodriguez | B23C 5/1081 407/118 |
| 5,199,827 A | 4/1993 | Pantzar | |
| 5,272,940 A * | 12/1993 | Diskin | B23C 5/1081 407/118 |
| 5,467,670 A * | 11/1995 | Alverio | B23C 5/10 76/104.1 |
| 5,624,301 A | 4/1997 | Lenz et al. | |
| 5,807,032 A * | 9/1998 | Abe | B23C 5/1081 228/124.5 |
| 6,616,387 B2 | 9/2003 | Schneider et al. | |
| 6,652,201 B2 * | 11/2003 | Kunimori | B23B 31/1075 407/35 |
| 6,851,897 B2 | 2/2005 | Kubo | |
| 7,014,394 B2 * | 3/2006 | Inglis | B23C 5/1081 407/53 |
| 7,073,988 B2 | 7/2006 | Giessler | |
| 7,178,517 B1 | 2/2007 | Yu | |
| 7,306,408 B2 * | 12/2007 | Wells | B23C 5/10 407/53 |
| 7,963,729 B2 | 6/2011 | Prichard et al. | |
| 8,029,338 B2 | 10/2011 | Kumar et al. | |
| 8,070,556 B2 | 12/2011 | Kumar et al. | |
| 8,092,124 B2 | 1/2012 | Spichtinger et al. | |
| 8,123,439 B2 | 2/2012 | Rouge et al. | |
| 8,231,311 B2 | 7/2012 | Ballas et al. | |
| 8,439,609 B2 | 5/2013 | Woodruff et al. | |
| 8,454,274 B2 | 6/2013 | Chen et al. | |
| 8,459,904 B2 | 6/2013 | Filho et al. | |
| 8,523,498 B2 | 9/2013 | Uno et al. | |
| 2006/0021610 A1 | 2/2006 | Turich et al. | |
| 2008/0247899 A1 * | 10/2008 | Cho | B22F 5/08 419/10 |
| 2009/0226268 A1 | 9/2009 | Pilkington | |
| 2010/0086373 A1 * | 4/2010 | Kleiner | B23D 77/006 408/1 R |
| 2010/0270757 A1 | 10/2010 | Beckington et al. | |
| 2011/0217131 A1 | 9/2011 | Bonnarang et al. | |
| 2012/0129434 A1 | 5/2012 | Hackman et al. | |
| 2013/0115017 A1 | 5/2013 | Schanz et al. | |
| 2013/0129429 A1 | 5/2013 | Filho et al. | |
| 2013/0164088 A1 | 6/2013 | Diamantis | |
| 2015/0093204 A1 * | 4/2015 | Raynor | B23C 5/10 407/32 |

* cited by examiner

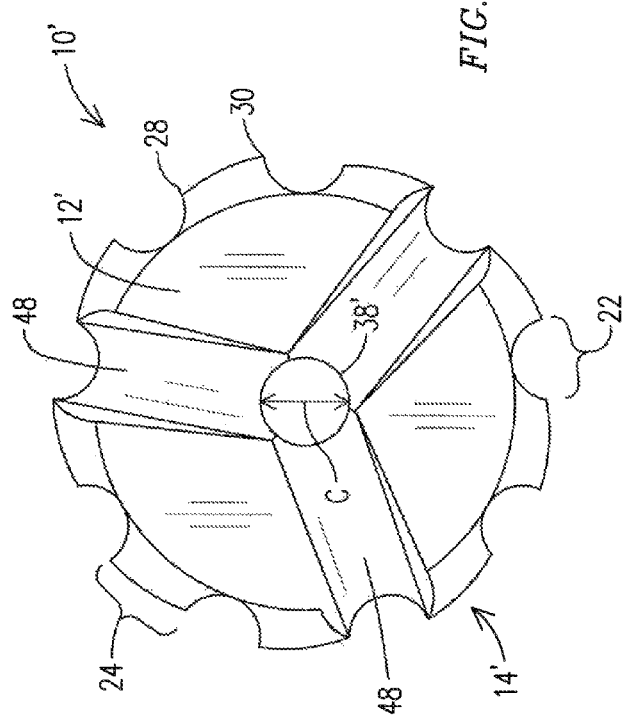
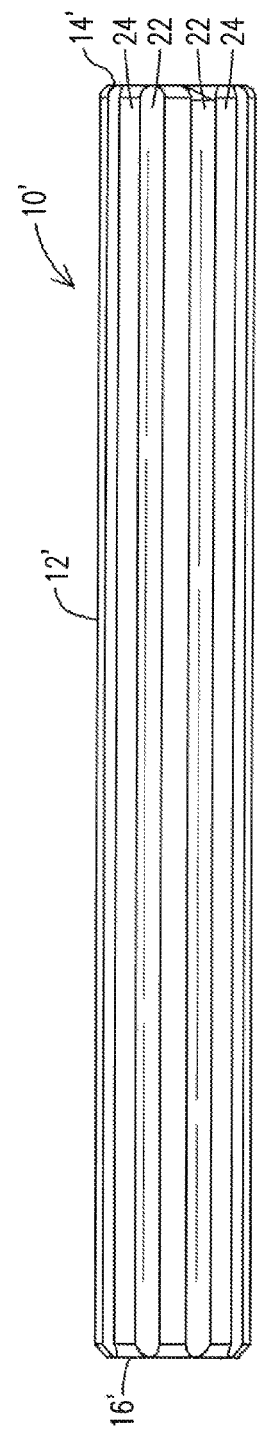
FIG. 4
FIG. 5

DIAMOND PLATED GRINDING ENDMILL FOR ADVANCED HARDENED CERAMICS MACHINING

FIELD OF INVENTION

The present disclosure is directed to a rotary grinding tool for sintered ceramic machining applications. More specifically, embodiments pertain to electroplated diamond coated carbide or steel bits used to grind hardened ceramic material.

BACKGROUND

Machining typically involves removing metal from workpieces and includes milling, drilling, turning, broaching, reaming and tapping and abrasive machining methods including sanding, grinding and polishing. Machining involves the use of a machining body and a cutting or grinding tool. In the prior art, milling methods include a multitude of successive machining steps, and more specifically a number of milling steps in which a tool is used and is moved with a rotary grinding motions about its own longitudinal axis. In addition, the workpiece to be machined may be moved with any desired feed movement relative to the tool. Various types of milling procedures accomplished by machining include, for example, end milling where a workpiece is fed into a revolving cutter to remove metal and the cutter removes the material as chips, conventional milling in which the cutter pushes the workpiece against the rotation of the tool bit, climb milling where the cutter or grinder "climbs" into the workpiece relieving feed force requirements, plunge cutting which requires a center cutting end mill, ramp cutting which includes axial feeding into a part, and peripheral milling which is accomplished by presenting the workpiece to the circumference or the periphery of the milling cutter.

It is known to a person skilled in the art to prefer a machining operation in "climb mode" rather than in "conventional mode", these two modes being defined not only as a function of the direction of rotation of the tool, but also as a function of the direction of the relative feed between the grinding tool and the workpiece to be machined. In the course of these milling operations, the grinding tools are worn down and need to be replaced frequently; therefore, there is a need for improvement in the prior art to increase the durability and longevity of these grinding tools.

BRIEF DESCRIPTION OF THE INVENTION

An embodiment of the invention is directed to a rotary grinding tool for advanced hardened ceramic machining applications, for example. The tool includes a generally cylindrically shaped body including a first end and a second end, a grinding portion adjacent to the first end and a shank portion adjacent to the second end. A plurality of flutes are formed in the grinding portion of the body of the tool, the flutes extending form the first end toward the shank portion of the body and a plurality of grinding elements are formed in the grinding portion of the body. The grinding elements extend from the first end toward the shank portion of the body, wherein each of the grinding elements are disposed between consecutive flutes along the grinding portion and each of the grinding elements include a grinding surface. Each grinding surface includes a leading edge between a flute and a portion of the grinding surface that first contacts a surface to be ground adjacent to the leading edge, and a trailing edge between the next consecutive flute and a portion of grinding surface that last contacts the surface to be ground adjacent to the trailing edge. A first radius of the tool at the leading edge of each grinding element is smaller than a second radius of the tool at the trailing edge of each grinding element and all first radii are substantially equal and all second radii are substantially equal.

In another embodiment, a rotary grinding tool for reducing damage to the tool during a milling operation is provided. The rotary grinding tool includes a generally cylindrical body including a first end and a second end, a grinding portion adjacent to the first end and a shank portion adjacent to the second end. An outer surface of the tool includes a diamond coating disposed on at least a grinding portion thereof. Two or more flutes are formed in the grinding portion of the body; the flutes are disposed along a longitudinal axis of the tool. At least one grinding element is formed in the grinding portion of the body along a longitudinal axis of the tool, the at least one grinding element is disposed between the two or more flutes. The grinding element includes a grinding surface, a leading edge between a flute and a portion of the grinding surface adjacent to the leading edge that first contacts a surface to be ground and a trailing edge between the next consecutive flute and a portion of the grinding surface adjacent to the trailing edge that last contacts the surface to be ground. A first radius of the tool at the leading edge of the at least one grinding element is smaller than a second radius of the tool at the trailing edge of the at least one grinding element.

In another embodiment, a rotary grinding tool including a generally cylindrically shaped body including a first end and a second end, a grinding portion adjacent to the first end and a shank portion adjacent to the second end. A plurality of flutes is formed in the body, the flutes extending from the first end toward the shank portion of the body. A plurality of grinding elements are formed in the body, the grinding elements extend from the first end toward the shank portion of the body, and each of the grinding elements are disposed between consecutive flutes long the body. Each of the grinding elements include a grinding surface, wherein each grinding surface includes a leading edge between a flute and a portion of the grinding surface that first contacts a surface to be ground adjacent to the leading edge, and a trailing edge between the next consecutive flute and a portion of grinding surface that last contacts the surface to be ground adjacent to the trailing edge. A thickness of the surface to be ground increases as at least one of the plurality of grinding elements rotate past a cutting plane of the tool.

BRIEF DESCRIPTION OF THE DRAWINGS

FIG. 4 is an end view of another embodiment of a rotary grinding tool shown in the side view of FIG. 5.

FIG. 5 is a side view of the rotary grinding tool embodiment shown in FIG. 4.

DETAILED DESCRIPTION

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained. The letters a, b, c, and d are used in the description herein to represent various radii and diameter measurements of the tool embodiments described. Each symbol may represent a different measurement in varying embodiments of the subject invention.

The inventors of the subject invention have developed a novel rotary grinding tool that exhibits a favorable geometry providing reduced wear and damage to the grinding tool during milling operations, thereby enhancing the quality of the grinding tool and prolonging the operable life of the grinding tool. The novel geometries of the rotary tools described herein provide significant increases in efficiency in milling hardened ceramics, making these processes much more practical.

Figure 1:
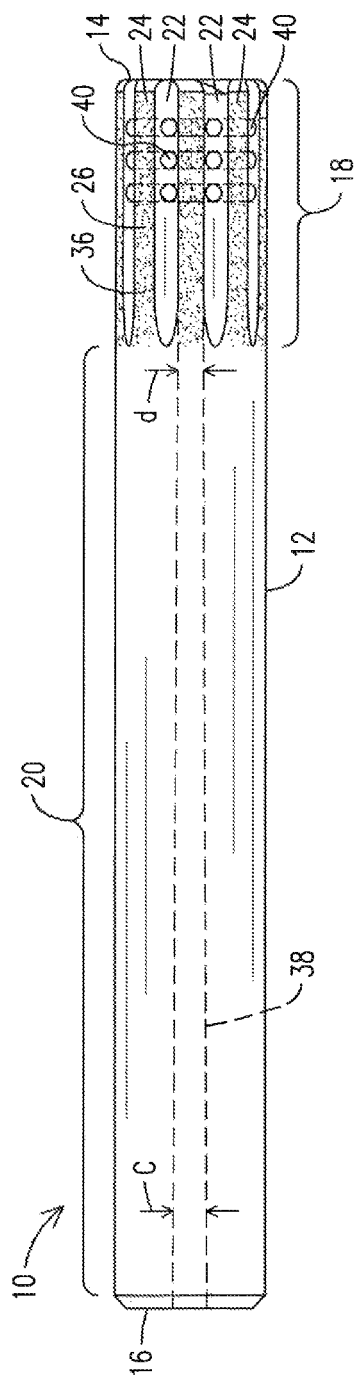
FIG. 1 is a side view of an embodiment of a rotary grinding tool.

FIG. 1 provides a side view of a rotary grinding tool embodiment 10 having a generally cylindrically shaped body 12, a first end 14, and a second end 16. A grinding portion 18 is provided near the first end 14 of the body 12, and a shank portion 20 is provided near the second end 16 of the body 12. The shank portion 20 is configured to fit into an apparatus to drive the tool 10 in a rotary motion, for milling procedures, for example. In a non-limiting example, the tool may be used with a Hurco VMX24HSi high speed mill.

The grinding portion 18 of the embodiment of the tool 10 shown in FIG. 1 includes a plurality of flutes 22 and grinding elements 24. Each flute 22 is disposed between two grinding elements 24 along the circumference of the tool 10. Each grinding element 24 includes a grinding surface 26 on its outer surface. The flutes 22 and grinding elements 24 are shown as extending from the first end 14 toward the shank portion 20 of the body 12. The rotary grinding tool 10 includes an electroplated diamond coating 36 on an outer surface of the tool 10 in an embodiment (shown in FIGS. 3A and 3B described below). The diamond coating 36 includes particles of diamond disposed in a matrix. The electroplated diamond coating 36 can be formed by way of an electroplated process wherein small particles of diamond are imbedded into a matrix as a composite coating. The coating can then Inventors be applied to the surface of the tool 10. The diamond coating 36 serves to create an abrading action against the hardened ceramics of which can near or exceed the hardness of the tool body 12 which the diamond matrix is adhered onto, also further protecting the grinding portion 18 of the tool 10 from damage caused to its surface during the milling process.

A central conduit 38 is formed along an axial length of the body 12 of the tool 10 and also extends from the first end 14 to the second end 16 of the body 12 in the embodiment shown in FIG. 1. The rotary grinding tool embodiments, as will be described in greater detail herein, are particularly useful for grinding hardened ceramic materials and other hard materials quickly due to the incomparable strength and durability of the described tool embodiment.

Figure 2:
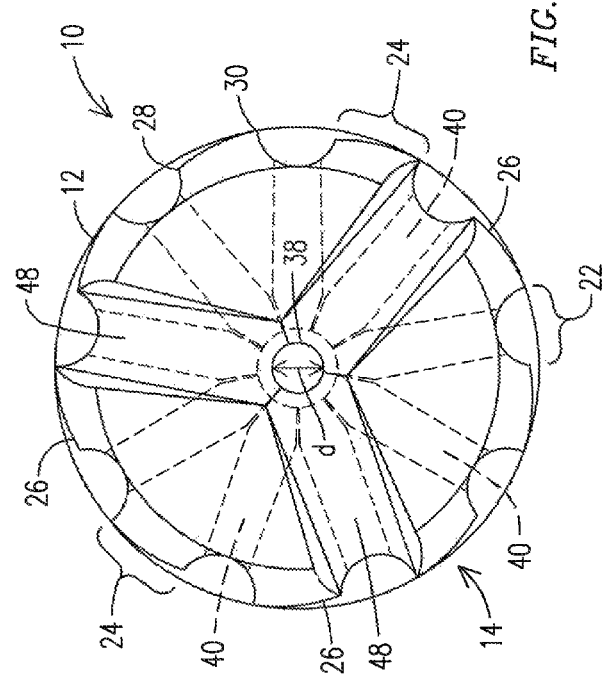
FIG. 2 is an end view of the rotary grinding tool embodiment shown in FIG. 1.

With respect to FIG. 2, an end view of the rotary grinding tool 10 shown in FIG. 1 is provided, wherein the first end 14 of the tool 10 is shown. The grinding surfaces 26 on the outer surface of each grinding element 24 are provided in the axial view of the tool embodiment 10 of FIG. 2. The grinding surface 26 is a generally convex surface, in an embodiment, and includes a leading edge 28 disposed between a flute 22 and a portion of the grinding surface 26 that first contacts a material or a surface to be ground, and a trailing edge 30 between the next consecutive flute 22 and a portion of the grinding surface 26 that last contacts the surface or material to be ground. A first radius designated "a" of the tool at the leading edge 28 of each grinding element 24 is smaller than a second radius designated "b" of the tool 10 at the trailing edge 30 of each grinding element 24. All first radii "a" are substantially equal and all second radii "b" are substantially equal.

During a milling operation, where the tool is rotated such that it "climbs" into the workpiece, a portion of the grinding surface 26 adjacent to the leading edge 28 of each grinding element 24 of the tool 10 contacts the material to be ground before the portion of the grinding surface 26 adjacent to the trailing edge portion 30 of each grinding element 24 of the tool contacts the material to be ground such that the grinding element 24 climbs up into the workpiece gradually as the trailing edge 30 completes the rotation of the grinding element 24 past a cutting plane 50 of the tool 10. This effectively decreases the impact on the grinding element 24 and thus reducing any damage to, or chipping of the workpiece material and of the diamond plated matrix at the leading edge 28 of the grinding element 24, where most prior art tools typically endure increased wear or even damage, and where most prior art tools damage and/or significantly degrade the structural integrity of the workpiece surface. The particular structure of the grinding portion of the tool is provided in greater detail below.

The central conduit 38 is configured to deliver a fluid (e.g., coolant) to the first end 14 of the tool 10. In some embodiments, a central conduit 38 diameter, designated "c", at the second end 16 of the tool 10 is greater than the central conduit 38 diameter, designated "d", at the first end 14 of the tool 10. The decrease in diameter between the second end diameter "c" and the first end diameter "d" of the central conduit 38 creates a backpressure upon delivery of coolant to the first end 14 of the tool 10. The backpressure of coolant flow created also delivers coolant through the central conduit 38 to the outer surface of the tool 10 by way of radial conduits 40 which connect between the central conduit 38 and the flutes 22 of the tool 10 as can be seen in FIGS. 1 and 2. While only shown as provided in the grinding portion 18 of the tool 10 in the embodiment provided in FIGS. 1 and 2, the flutes 22, grinding elements 24, and radial conduits 40 may be provided along the entire length of the body 12 or in any section or portion of the body 12 of the tool 10. The radial conduits 40 terminate in the openings shown in the grinding portion 18 of the tool 10 in an embodiment, as demonstrated in FIG. 2, which allow the coolant to flow from the central conduit 38 through the radial conduits 40. Coolant delivered from the central conduit 38 may also flow through the end face groove(s) 48 at the first end 14 both providing cooling and flushing effect to the tool 10. Cooling of the tool 10 is particularly beneficial during a milling operation in order to reduce heat build-up in the tool and in the material to be ground, and to preserve the condition of the tool 10. The flushing effect of the coolant also serves to remove material out and away from grinding portion 18 of the tool 10. Some coolant may travel through the central conduit 38 toward the first end 14 of the tool 10 and into the end face groove(s) 48 to cool the first end 14 of the tool embodiment 10. The novel structure of the tool 10 also reduces grinding pressure, a further benefit unique to this tool structure.

While the embodiment of the tool 10 shown in FIG. 2 provides a first end 14 with three end face grooves 48, in other embodiments the tool 10 may be provided with one or two end face grooves 48 or more than three end face grooves 48. Each end face groove 48 is shown at the first end 14 of the tool 10 as connecting between the central conduit 38 and a flute 22; however, the end face grooves 48 are not limited to connection as such, as an end face groove 48 could connect between the central conduit 38 and a grinding element 24 at the first end 14 or the second end 16 of the tool 10, in other non-limiting embodiments.

Figure 3A:
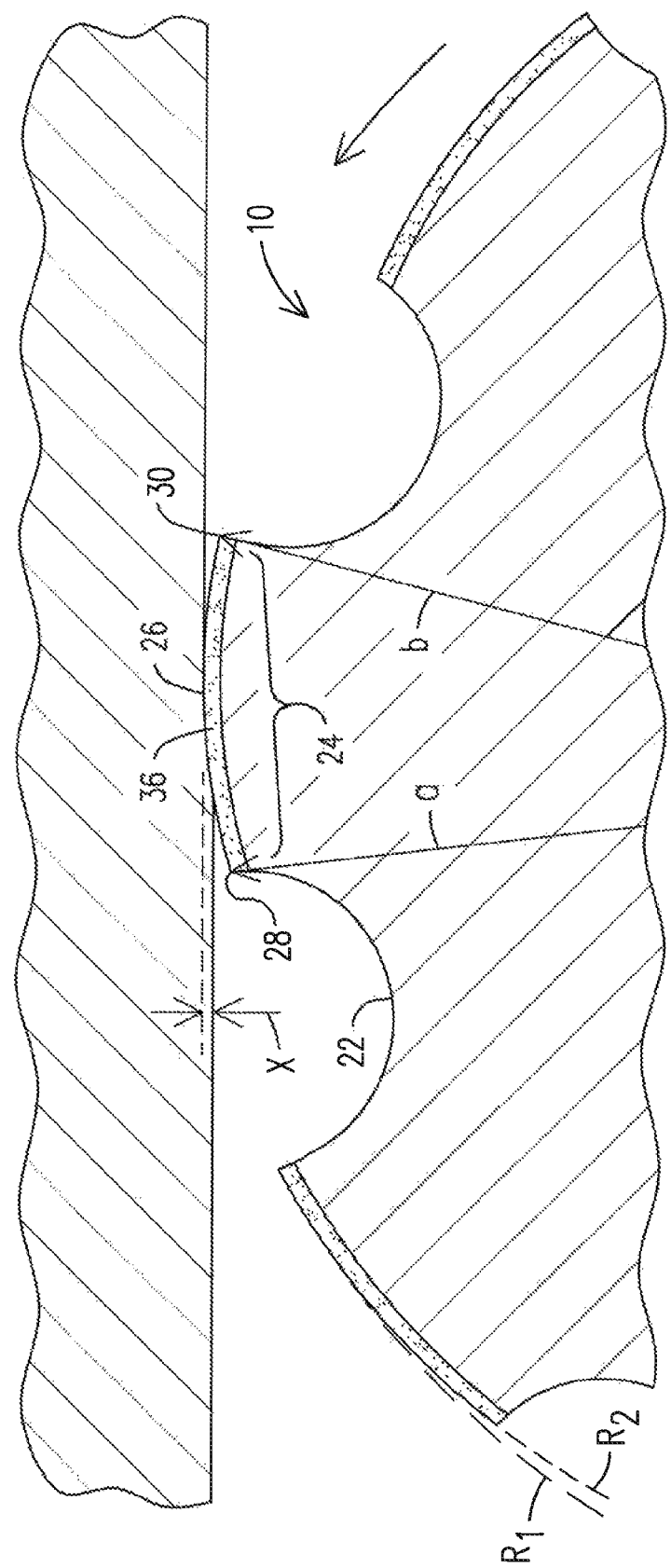
FIG. 3A is a sectional view of a portion of a first end of a rotary grinding tool embodiment depicting the tool engaging the workpiece.
Figure 3B:
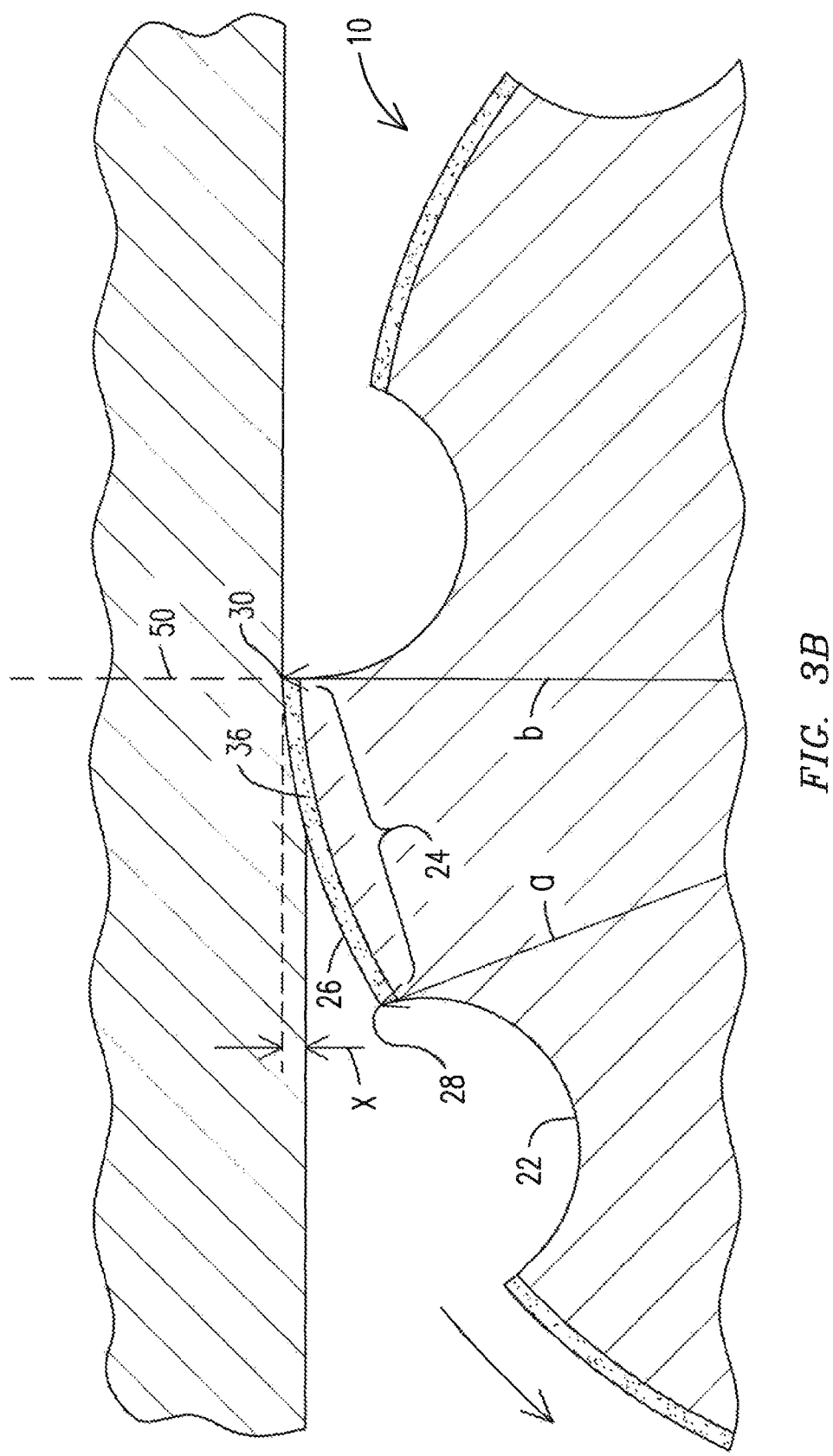
FIG. 3B is a sectional view of the portion of the first end of the rotary grinding tool embodiment of FIG. 3A depicting the tool engaging the workpiece as the tool is rotated in a counter clockwise direction.

The configuration of the grinding elements 24 of the tool 10 as shown in the sectional end views of FIGS. 3A and 3B including the leading edge 28 having a smaller radius "a" than the trailing edge 30 radius "b", provides benefits in reducing cutting pressure and damage to the tool during a milling operation. Due to the configuration of the grinding elements 24, chipping of the electroplated diamond coating 36 can be prevented resulting in extension of the working life of the tool 10.

As the tool rotates into the surface of the material to be ground such that the leading edge 28 of each grinding element 24 first contacts the surface to be ground, the grinding surface 26 rises or "climbs" up gradually into the surface of the material to be ground. Chip thickness "X", as illustrated in FIGS. 3A-B is the portion of the material that is ground down by the tool 10 during the milling process, and the chip thickness "X" increases as the tool 10 rotates against the workpiece from the portion of the grinding surface that first contacts the surface to be ground toward the portion of the grinding surface that last contacts the surface to be ground during the rotation of each grinding element 24 past the cutting plane 50. The illustrated chip thickness "X" in FIGS. 3A and 3B are provided only as non-limiting examples of an amount of material to be ground during a milling operation.

In the embodiment of FIG. 3A, arc $R_1$ delineates a radius of curvature of the theoretical tool circumference, which is greater than arc $R_2$, a radius of curvature of the grinding element 24, in one embodiment. The theoretical tool circumference denotes the circumference of the tool before it is shaped to include the grinding elements and flutes as shown herein.

The tool 10 as described herein can be formed, in part or in whole, of tungsten carbide, in a non-limiting embodiment. Tungsten carbide provides a dense, dampening working body, particularly when the tool is used to machine hardened materials such as ceramics which are susceptible to vibration harmonics that naturally occur in machining processes. The tool 10 may include other materials such as steel, cobalt, or ceramic in other non-limiting embodiments.

FIG. 4 provides an end view of another embodiment of a rotary grinding tool 10'. The rotary grinding tool 10' also includes a generally cylindrical body 12' with a first end 14' and a second end 16'. The tool 10' further includes flutes 22 formed in the body 12' and grinding elements 24 disposed between the flutes 22 along the longitudinal axis of the tool 10' extending from the first end 14' to the second end 16'. A central conduit 38' is disposed along the axial length of the rotary grinding tool 10', and in the tool embodiment 10' of FIGS. 4-5, the central conduit 38' maintains a generally consistent diameter "c" from the first end 14' to the second end 16' of the tool 10', in contrast to the decreasing diameter of the central conduit 38 from the second end 16 to the first end 14 of the tool embodiment 10 of FIGS. 1-2. Alternatively, in another embodiment, the diameter of the central conduit 38' may decrease gradually from the second end 16' to the first end 14' of the tool 10' and may create a backpressure as described with regard to FIGS. 1-2 above.

FIG. 5 provides a side view of the rotary grinding tool 10' embodiment of FIG. 4, wherein the flutes 22 and grinding elements 24 are shown as extending from the first end 14' to the second end 16' of the tool 10'. The central conduit 38' may extend from the first end 14' to the second end 16' of the tool 10' or may extend from the first end 14' to a surface of the outer diameter of the tool 10' such that a coolant or other fluid may be passed through the tool 10'. In the end view of FIG. 4, three end face grooves 48 are shown as extending from the central conduit 38 toward the flutes 22 of the tool 10'. However, as aforementioned, any number of end face grooves 48 may be provided. As a result of the flutes 22 which extend from the first end 14' to the second end 16' of the tool embodiment 10', no radial conduits 40 are necessary in this alternative tool embodiment 10', as any fluid or coolant which is passed through the machine spindle will be forced into the central conduit 38', will circulate through the end face grooves 48. Some of this coolant will also be forced to the outside of and down the length of the body 12' of the tool 10' via the flutes 22 to effectively cool and flush the tool 10' before, during, or after use. However, in the tool embodiment 10', radial conduits 40 may be provided in conjunction with the flutes 22 which extend from the first end 14' to the second end 16' to further assist in the cooling and flushing process.

Figure 6:
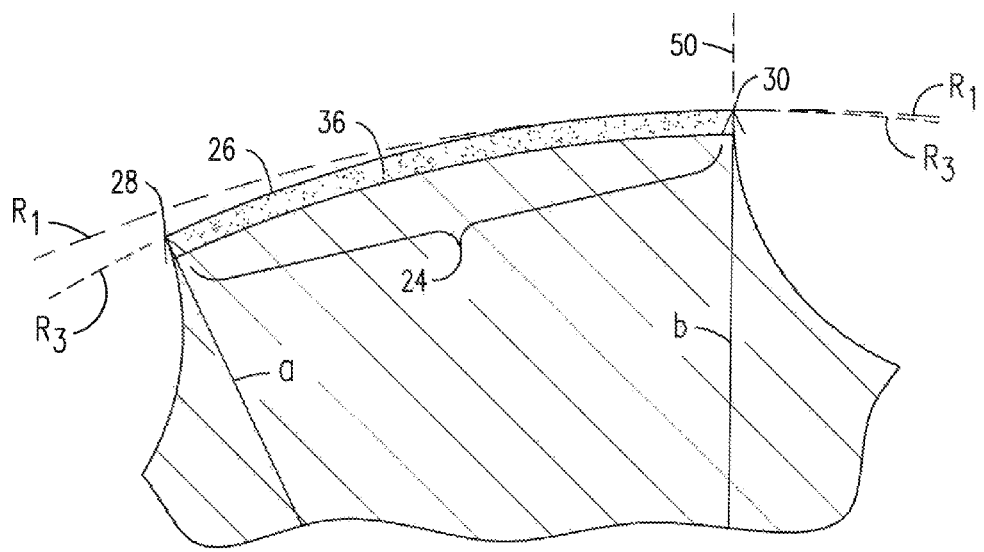
FIG. 6 is a sectional view of a cross section of a grinding element embodiment in which the radius of curvature of the grinding surface is substantially equal to the radius of curvature of the theoretical tool circumference.

FIG. 6 provides a sectional view of a cross section of an embodiment of a grinding element 24' the radius of curvature of the theoretical tool circumference $R_1$ is greater than the radius of curvature $R_3$ of the grinding surface 26. The first radius "a" at the leading edge 28 of the grinding element 24 is smaller than the second radius "b" at the trailing edge 30 of the grinding element 24. In this embodiment, the leading edge 28 does not come in contact with the workpiece surface as the grinding element 24 rotates past the cutting plane 50; however, the grinding surface 26 climbs up into the workpiece as the grinding element 24 rotates past the cutting plane 50.

Figure 7:
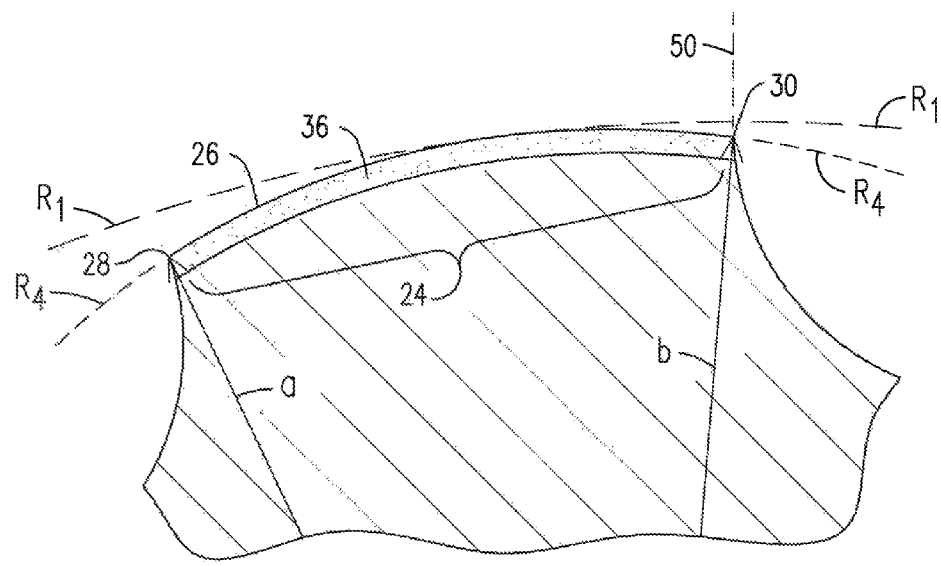
FIG. 7 is a sectional view of a cross section of a grinding element embodiment in which the radius of curvature of the grinding surface is smaller than the radius of curvature of the theoretical tool circumference.

In another embodiment of the grinding element 24 shown in sectional view of the cross section of the grinding element 24 of FIG. 7, the radius of curvature $R_4$ of the grinding surface 26 is smaller than the radius of curvature $R_1$ of the theoretical tool circumference. In this alternative embodiment, the radius "a" at the leading edge 28 is substantially equal to the radius "b" at the trailing edge 30 (wherein the trailing edge radius "b" may be slightly greater than the leading edge radius "a" as shown in FIG. 7, in some embodiments) of the grinding element 24. The grinding surface 26 climbs up into the workpiece as the grinding element 24 rotates past the cutting plane 50. The leading edge 28 and the trailing edge 30 do not come in contact with the workpiece as the tool 10 rotates, rotating the grinding element 24 past the cutting plane 50 in this particular embodiment. The grinding surface 26 is generally convex between the leading edge 28 and the trailing edge 30 in the embodiment of FIG. 7. In some instances, the embodiment of FIG. 7 can be used to grind a workpiece by rotating either counterclockwise (as shown) or clockwise against the workpiece.

In the embodiments described herein, the tool may be fabricated from any material of sufficient strength to withstand the grinding force of the milling process. Such materials may include, but are not limited to tungsten carbide and other materials known in the art. Any number of flutes, grinding elements and conduits may be provided on the tool and are contemplated herein.

While certain embodiments of the present invention have been shown and described herein, such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A rotary grinding tool, comprising:
   a generally cylindrically shaped body comprising a first end and second end, a grinding portion adjacent to the first end and a shank portion adjacent to the second end;
   a plurality of flutes formed in the grinding portion of the body, said flutes extending from the first end toward the shank portion of the body;
   a plurality of grinding elements formed in the grinding portion of the body, said grinding elements extending from the first end toward the shank portion of the body, each of said grinding elements disposed between consecutive flutes along the grinding portion, and each of said grinding elements comprise a grinding surface, each grinding surface comprises a leading edge between a flute and a portion of the grinding surface adjacent to the leading edge that first contacts a surface to be ground and a trailing edge between the next consecutive flute and a portion of the grinding surface adjacent to the trailing edge that last contacts the surface to be ground; and
   wherein a first radius of the tool at the leading edge of each grinding element is smaller than a second radius of the tool at the trailing edge of each grinding element, and all first radii are substantially equal and all second radii are substantially equal.

2. The rotary grinding tool of claim 1, wherein the rotary grinding tool comprises an electroplated diamond coating on an outer surface of the rotary grinding tool, said diamond coating comprising small particles of diamond disposed in a matrix.

3. The rotary grinding tool of claim 1, wherein a central conduit is formed along an axial length of the body of the tool, wherein the diameter of the central conduit is greater at the second end of the tool than at the first end of the tool, said central conduit is configured to deliver a coolant to the first end of the rotary grinding tool.

4. The rotary grinding tool of claim 3, wherein the rotary grinding tool comprises one or more radial conduits extending radially from the central conduit to at least one of said plurality of flutes, said one or more radial conduits are configured to deliver a coolant to an outer surface of the rotary grinding tool.

5. The rotary grinding tool of claim 3, further comprising at least one end face groove on the first end of the tool, said end face groove extending from a first end of the central conduit to one of the plurality of flutes.

6. The rotary grinding tool of claim 1, wherein the plurality of grinding elements and the plurality of flutes extend from the first end to the second end of the body of the tool.

7. A rotary grinding tool for reducing damage to the tool during a milling operation, comprising:
   a generally cylindrical body comprising a first end and a second end, a grinding portion adjacent to the first end and a shank portion adjacent to the second end;
   an outer surface of the tool comprising a diamond coating disposed on at least a grinding portion thereof;
   two or more flutes formed in the grinding portion of the body, said flutes disposed along a longitudinal axis of the tool; and
   at least one grinding element formed in the grinding portion of the body along a longitudinal axis of the tool, said at least one grinding element disposed between said two or more flutes, said grinding element comprising a grinding surface, a leading edge between a flute and a portion of the grinding surface that first contacts a surface to be ground adjacent to the leading edge and a trailing edge between the next consecutive flute and a portion of the grinding surface that last contacts the surface to be ground adjacent to the trailing edge;
   wherein a first radius of the tool at the leading edge of the at least one grinding element is smaller than a second radius of the tool at the trailing edge of the at least one grinding element.

8. The rotary grinding tool of claim 7, wherein the diamond coating is formed on the outer surface of the tool by an electroplating process such that small particles of diamond are disposed in a matrix on the outer surface of the tool.

9. The rotary grinding tool of claim 7, wherein a central conduit is formed along an axial length of the tool, wherein the diameter of the central conduit is greater at the second end than at the first end, said conduit is configured to deliver a coolant to the first end of the body of the rotary grinding tool.

10. The rotary grinding tool of claim 9, further comprising one or more radial conduits extending radially from the central conduit to an outer surface of the two or more flutes, said one or more radial conduits configured to deliver a coolant to an outer surface of the rotary grinding tool.

11. The rotary grinding tool of claim 9, further comprising at least one end face groove on the first end of the tool, said end face groove extending from a first end of the central conduit to one of the two or more flutes.

12. The rotary grinding tool of claim 7, wherein the at least one grinding element and the two or more flutes extend from the first end to the second end of the body of the tool.

13. A rotary grinding tool comprising:
   a generally cylindrically shaped body comprising a first end and second end, a grinding portion adjacent to the first end and a shank portion adjacent to the second end;
   a plurality of flutes formed in the body, said flutes extending from the first end toward the shank portion of the body;
   a plurality of grinding elements formed in the body, said grinding elements extending from the first end toward the shank portion of the body, wherein each of said grinding elements are disposed between consecutive flutes along the body, and wherein each of said grinding elements comprise a grinding surface, wherein each grinding surface comprises a leading edge between a flute and a portion of the grinding surface that first contacts a surface to be ground adjacent to the leading edge and a trailing edge between the next consecutive flute and a portion of grinding surface that last contacts the surface to be ground adjacent to the trailing edge; and wherein a thickness of the surface to be ground increases as at least one of the plurality of grinding elements rotate past a cutting plane of the tool.

14. The rotary grinding tool of claim 13, wherein a first radius of the tool at the leading edge of each grinding element is smaller than a second radius of the tool at the trailing edge of each grinding element, and all first radii of the tool are substantially equal and all second radii of the tool are substantially equal.

15. The rotary grinding tool of claim 13, wherein a first radius of the tool at the leading edge of each grinding element is substantially equal to a second radius of the tool at the trailing edge of each grinding element, and wherein each grinding element forms a generally convex shape between the leading edge and the trailing edge.

16. The rotary grinding tool of claim 13, wherein the grinding tool comprises an electroplated diamond coating on at least a portion of an outer surface of the grinding tool, said diamond coating comprising small particles of diamond disposed in a matrix.

17. The rotary grinding tool of claim 13, wherein a central conduit is formed along an axial length of the body of the tool, wherein the diameter of the central conduit is greater at the second end of the tool than at the first end of the tool, said central conduit is configured to deliver a coolant to the first end of the grinding tool.

18. The rotary grinding tool of claim 17, further comprising one or more radial conduits extending radially from the central conduit to at least one of said plurality of flutes, said one or more radial conduits are configured to deliver a coolant to an outer surface of the grinding tool.

19. The rotary grinding tool of claim 17, further comprising at least one end face groove on the first end of the tool, said end face groove extending from a first end of the central conduit to one of the plurality of flutes.

20. The rotary grinding tool of claim 13, wherein the plurality of grinding elements and the plurality of flutes extend from the first end to the second end of the body of the tool.

* * * * *